(12) United States Patent
Lundberg (10) Patent No.: US 12,368,592 B2
(45) Date of Patent: Jul. 22, 2025

(54) CRYPTOGRAPHIC SIGNING OF A DATA ITEM

(71) Applicant: ASSA ABLOY AB, Stockholm (SE)

(72) Inventor: Frans Lundberg, Saltsjöbaden (SE)

(73) Assignee: ASSA ABLOY AB, Stockholm (SE)

( * ) Notice: Subject to any disclaimer, the term of this patent is extended or adjusted under 35 U.S.C. 154(b) by 528 days.

(21) Appl. No.: 17/620,060

(22) PCT Filed: Jun. 22, 2020

(86) PCT No.: PCT/EP2020/067339
§ 371 (c)(1),
(2) Date: Dec. 16, 2021

(87) PCT Pub. No.: WO2020/260195
PCT Pub. Date: Dec. 30, 2020

(65) Prior Publication Data
US 2022/0311617 A1    Sep. 29, 2022

(30) Foreign Application Priority Data
Jun. 28, 2019   (SE) .................................. 1950814-2

(51) Int. Cl.
*H04L 9/32* (2006.01)
*H04L 9/40* (2022.01)

(52) U.S. Cl.
CPC .......... *H04L 9/3234* (2013.01); *H04L 9/3247* (2013.01); *H04L 63/0853* (2013.01)

(58) Field of Classification Search
CPC ............... H04L 9/3263; H04L 63/0428; H04L 63/0823; H04L 2209/56; H04L 9/3239;
(Continued)

(56) References Cited

U.S. PATENT DOCUMENTS 5,737,419 A * 4/1998 Ganesan ............... H04L 9/3218
713/169
5,905,799 A    5/1999 Ganesan
(Continued)

FOREIGN PATENT DOCUMENTS

CN    101765996    6/2010
CN    104040555    9/2014
(Continued)

OTHER PUBLICATIONS

"Introduction to SplitKey Foundations White paper," Cybernetica, Dec. 12, 2018, version 1.0, 10 pages [retrieved online from: cyber.ee/products/digital-identity/materials/splitkey-whitepaper.pdf].
(Continued)

*Primary Examiner* — Scott B Christensen
(74) *Attorney, Agent, or Firm* — Schwegman Lundberg & Woessner, P.A.

(57) ABSTRACT it is provided a method for performing a cryptographic signing operation of a data item. The method is performed in a server and comprises the steps of: receiving, from a smartcard reader, a request for a data item to be collectively signed, the request comprising an indication of the data item and an identifier of a smartcard, wherein the collective signing requires the use of both a smartcard secret key and a server secret key for the collective signature to be valid; establishing a secure channel with the smartcard; collaborating with the smartcard over the secure channel to provide a collective signature of the data item, wherein the server bases the signature on the data item and a server secret key, wherein the server secret key is specifically associated with the smartcard secret key, resulting in a collective signature; and sending the collective signature to the smartcard reader.

17 Claims, 3 Drawing Sheets

(58) Field of Classification Search
CPC ..... H04L 9/3234; H04L 9/50; H04L 63/0853; H04L 9/3247; H04W 12/06
See application file for complete search history.

(56) References Cited

U.S. PATENT DOCUMENTS

| | | | | |
|---|---|---|---|---|
| 7,096,204 | B1* | 8/2006 | Chen | G06Q 20/383 |
| | | | | 705/25 |
| 7,296,160 | B2* | 11/2007 | Hiltgen | H04L 63/0823 |
| | | | | 713/172 |
| 7,526,785 | B1* | 4/2009 | Pearson | G06F 21/85 |
| | | | | 725/31 |
| 8,316,237 | B1* | 11/2012 | Felsher | H04L 63/061 |
| | | | | 380/282 |
| 9,137,420 | B1* | 9/2015 | Vasudevan | H04N 1/32144 |
| 9,727,862 | B2* | 8/2017 | O'Connell | G06Q 20/4014 |
| 2002/0166000 | A1* | 11/2002 | Rossi | G06F 9/4843 |
| | | | | 718/107 |
| 2003/0177353 | A1* | 9/2003 | Hiltgen | H04L 63/0869 |
| | | | | 713/161 |
| 2004/0124246 | A1* | 7/2004 | Allen | G06Q 20/108 |
| | | | | 235/492 |
| 2005/0044386 | A1 | 2/2005 | Libin et al. | |
| 2005/0271201 | A1* | 12/2005 | Shimizu | H04L 9/004 |
| | | | | 380/28 |
| 2007/0241182 | A1* | 10/2007 | Buer | H04L 63/0853 |
| | | | | 235/380 |
| 2008/0154770 | A1* | 6/2008 | Rutherford | G07F 7/1008 |
| | | | | 705/44 |
| 2009/0065592 | A1* | 3/2009 | Paul | G06F 21/77 |
| | | | | 235/492 |
| 2009/0287837 | A1* | 11/2009 | Felsher | G06F 21/6245 |
| | | | | 709/229 |
| 2009/0322477 | A1* | 12/2009 | Celorio | G07C 9/257 |
| | | | | 340/5.82 |
| 2010/0186076 | A1* | 7/2010 | Ali | G07F 7/1008 |
| | | | | 726/9 |
| 2010/0235285 | A1* | 9/2010 | Hoffberg | G06Q 50/188 |
| | | | | 705/37 |
| 2010/0317420 | A1* | 12/2010 | Hoffberg | G06Q 30/0282 |
| | | | | 463/1 |
| 2011/0209213 | A1* | 8/2011 | Wooten | G06F 21/72 |
| | | | | 726/21 |
| 2012/0084849 | A1* | 4/2012 | Lecocq | H04L 63/0861 |
| | | | | 726/9 |
| 2013/0159021 | A1* | 6/2013 | Felsher | G16H 10/60 |
| | | | | 705/3 |
| 2015/0312041 | A1* | 10/2015 | Choi | H04L 63/0861 |
| | | | | 713/175 |
| 2016/0012465 | A1* | 1/2016 | Sharp | G06Q 20/321 |
| | | | | 705/14.17 |
| 2017/0243410 | A1* | 8/2017 | Caballero | G07C 5/008 |
| 2017/0278104 | A1 | 9/2017 | O'Connell et al. | |
| 2020/0160641 | A1* | 5/2020 | Ruskin | H04L 9/0877 |

FOREIGN PATENT DOCUMENTS

| | | | | |
|---|---|---|---|---|
| CN | 105850098 | | 8/2016 | |
| EP | 2965295 | | 1/2016 | |
| EP | 2991262 | | 3/2016 | |
| WO | WO-2007135619 | A2 * | 11/2007 | ......... H04L 63/0853 |

OTHER PUBLICATIONS

Ford et al. "Collective Edwards-Curve Digital Signature Algorithm," IETF Trust, Jun. 30, 2017, 15 pages [retrieved online from: tools.ietf.org/id/draft-ford-cfrg-cosi-oo.html].
Kutylowski et al. "Mediated RSA cryptography specification for additive private key splitting (mRSAA)," IETF Trust, Apr. 28, 2012, 58 pages [retrieved online from: tools.ietf.org/html/draft-kutylowski-mrsa-algorithm-00].
Olsson "DualSalt, distributed signing and decryption for NaCl," GitHub, Feb. 18, 2019, 18 pages [retrieved online from: github.com/assaabloy-ppi/dualsalt/blob/master/doc/dualsalt.pdf].
Official Action for Sweden Patent Application No. 1950814-2, dated Mar. 24, 2020, 13 pages.
International Search Report and Written Opinion for International (PCT) Patent Application No. PCT/EP2020/067339, dated Sep. 7, 2020, 11 pages.
Second Written Opinion for International (PCT) Patent Application No. PCT/EP2020/067339, dated May 10, 2021, 6 pages.
International Preliminary Report on Patentability for International (PCT) Patent Application No. PCT/EP2020/067339, dated Sep. 21, 2021, 21 pages.
Official Action for Sweden Patent Application No. 1950814-2, dated Oct. 27, 2022, 3 pages.
"CN202080043652 First Chinese Office Action mailed Mar. 27, 2025", with English translation, 26 pages.

* cited by examiner

CRYPTOGRAPHIC SIGNING OF A DATA ITEM

CROSS REFERENCE TO RELATED APPLICATIONS

This application is a national stage application under 35 U.S.C. 371 and claims the benefit of PCT Application No. PCT/EP2020/067339 having an international filing date of Jun. 22, 2020, which designated the United States, which PCT application claimed the benefit of Sweden Patent Application No. 1950814-2 filed Jun. 28, 2019, the disclosure of each of which are incorporated herein by reference.

TECHNICAL FIELD

The present disclosure relates to the field of cryptographic signing of a data item and in particular to a server, smartcard reader, smartcard, methods, computer programs and computer program products for performing or enabling cryptographic signing operation of a data item.

BACKGROUND

Cryptographic signing is a known procedure to allow verification of digital data items, e.g. documents. The signing can be based on a key pair comprising a secret (also known as private) key and a public key, where the secret key is used for the signing operation and the resulting signature can be checked using the public key.

The cryptographic signing can occur in many different situations. In many cases, it is of great benefit if the user, and thus the secret key, are mobile, so that the signing operation can occur in the field. For instance, the secret key can be held in a carrier device, such as a smartphone.

However, since the secret key then needs to be mobile, the security of the secret key is reduced, since the carrier device, containing the secret key could be stolen.

SUMMARY

One objective is to improve the ability and security to perform digital signing of a data item.

According to a first aspect, it is provided a method for performing a cryptographic signing operation of a data item. The method is performed in a server and comprises the steps of: receiving, from a smartcard reader, a request for a data item to be collectively signed, the request comprising an indication of the data item and an identifier of a smartcard, wherein the collective signing requires the use of both a smartcard secret key and a server secret key for the collective signature to be valid; querying a user associated with the smartcard to sign the data item; receiving a response indicating that the user approves to sign the data item; establishing a secure channel with the smartcard; collaborating with the smartcard over the secure channel to provide a collective signature of the data item, wherein the server bases computation of the collective signature on the data item, a server secret key and data received from the smartcard, wherein the server secret key is specifically associated with the smartcard secret key, resulting in a collective signature; and sending the collective signature to the smartcard reader.

The identifier of the smartcard may be a public key of the smartcard, wherein the server secret key and the smartcard secret key collectively correspond to the public key of the smartcard.

In one embodiment, the querying is only performed when a query condition is true, the query condition being associated with the smartcard.

The method may further comprise the steps of: obtaining a verified identity associated with the smartcard; and sending the verified identity to the smartcard reader.

According to a second aspect, it is provided a server for performing a cryptographic signing operation of a data item. The server comprises: a processor; and a memory storing instructions that, when executed by the processor, cause the server to: receive, from a smartcard reader, a request for a data item to be collectively signed, the request comprising an indication of the data item and an identifier of a smartcard, wherein the collective signing requires the use of both a smartcard secret key and a server secret key for the collective signature to be valid; query a user associated with the smartcard to sign the data item; receive a response indicating that the user approves to sign the data item; establish a secure channel with the smartcard; collaborate with the smartcard over the secure channel to provide a collective signature of the data item, wherein the server bases computation of the collective signature on the data item, a server secret key and data received from the smartcard, wherein the server secret key is specifically associated with the smartcard secret key, resulting in a collective signature; and send the collective signature to the smartcard reader.

The identifier of the smartcard may be a public key of the smartcard, wherein the server secret key and the smartcard secret key collectively correspond to the public key of the smartcard.

The server may further comprise instructions that, when executed by the processor, cause the server to: only execute the instructions to query when a query condition is true, the query condition being associated with the smartcard.

The server may further comprise instructions that, when executed by the processor, cause the server to: obtain a verified identity associated with the smartcard; and send the verified identity to the smartcard reader.

According to a third aspect, it is provided a computer program for performing a cryptographic signing operation of a data item. The computer program comprising computer program code which, when run on a server causes the server to: receive, from a smartcard reader, a request for a data item to be collectively signed, the request comprising an indication of the data item and an identifier of a smartcard, wherein the collective signing requires the use of both a smartcard secret key and a server secret key for the collective signature to be valid; query a user associated with the smartcard to sign the data item; receive a response indicating that the user approves to sign the data item; establish a secure channel with the smartcard; collaborate with the smartcard over the secure channel to obtain a collective signature of the data item, wherein the server bases computation of the collective signature on the data item, a server secret key and data received from the smartcard, wherein the server secret key is specifically associated with the smartcard secret key, resulting in a collective signature; and send the collective signature to the smartcard reader.

According to a fourth aspect, it is provided a computer program product comprising a computer program according to the third aspect and a computer readable means on which the computer program is stored.

According to a fifth aspect, it is provided a method for performing a cryptographic signing operation of a data item. The method is performed in a smartcard and comprises the steps of: establishing a connection with a smartcard reader;

sending, to the smartcard reader connection details to a server associated with the smartcard; establishing a secure channel with the server; and collaborating with the server over the secure channel to provide a collective signature of the data item, wherein the smartcard bases the signature on the data item and a smartcard secret key, wherein the collective signing requires the use of both the smartcard key and a server secret key for the collective signature to be valid.

According to a sixth aspect, it is provided a smartcard for performing a cryptographic signing operation of a data item. The smartcard comprises: a processor; and a memory storing instructions that, when executed by the processor, cause the smartcard to: establish a connection with a smartcard reader; send, to the smartcard reader connection details to a server associated with the smartcard; establish a secure channel with the server; and collaborate with the server over the secure channel to provide a collective signature of the data item, wherein the smartcard bases the signature on the data item and a smartcard secret key, wherein the collective signing requires the use of both the smartcard key and a server secret key for the collective signature to be valid.

According to a seventh aspect, it is provided a computer program for performing a cryptographic signing operation of a data item. The computer program comprises computer program code which, when run on a smartcard causes the smartcard to: establish a connection with a smartcard reader; send, to the smartcard reader connection details to a server associated with the smartcard; establish a secure channel with the server; and collaborate with the server over the secure channel to provide a collective signature of the data item, wherein the smartcard bases the signature on the data item and a smartcard secret key, wherein the collective signing requires the use of both the smartcard key and a server secret key for the collective signature to be valid.

According to an eighth aspect, it is provided a computer program product comprising a computer program according to the seventh aspect and a computer readable means on which the computer program is stored.

According to a ninth aspect, it is provided a system comprising the server according to the second aspect and the smartcard according to the sixth aspect.

According to a tenth aspect, it is provided a method for enabling a cryptographic signing operation of a data item. The method is performed in a smartcard reader and comprises the steps of: determining a data item to be cryptographically signed; establishing a connection with a smartcard; receiving, from the smartcard, connection details to a server associated with the smartcard; sending, to the server, a request for the data item to be collectively signed, the request comprising an indication of the data item and an identifier of the smartcard, wherein the collective signing requires the use of both a smartcard secret key and a server secret key for the collective signature to be valid; receiving the collective signature from the server; and determining whether the data item is collectively signed based on the collective signature and a public key associated with the collective signature.

The method may further comprise the step of: receiving a verified identity from the server, the verified identity being associated with the smartcard.

According to an eleventh aspect, it is provided a smartcard reader for enabling a cryptographic signing operation of a data item. The smartcard reader comprises: a processor; and a memory storing instructions that, when executed by the processor, cause the smartcard reader to: determine a data item to be cryptographically signed; establish a connection with a smartcard; receive, from the smartcard connection details to a server associated with the smartcard; send, to the server, a request for the data item to be collectively signed, the request comprising an indication of the data item and an identifier of the smartcard, wherein the collective signing requires the use of both a smartcard secret key and a server secret key for the collective signature to be valid; receive the collective signature from the server; and determine whether the data item is collectively signed based on the collective signature and a public key associated with the collective signature.

The smartcard reader may further comprise instructions that, when executed by the processor, cause the smartcard reader to: receive a verified identity from the server, the verified identity being associated with the smartcard.

According to a twelfth aspect, it is provided a computer program for enabling a cryptographic signing operation of a data item. The computer program comprising computer program code which, when run on a smartcard reader causes the smartcard reader to: determine a data item to be cryptographically signed; establish a connection with a smartcard; receive, from the smartcard connection details to a server associated with the smartcard; send, to the server, a request for the data item to be collectively signed, the request comprising an indication of the data item and an identifier of the smartcard, wherein the collective signing requires the use of both a smartcard secret key and a server secret key for the collective signature to be valid; receive the collective signature from the server; and determine whether the data item is collectively signed based on the collective signature and a public key associated with the collective signature.

According to a thirteenth aspect, it is provided a computer program product comprising a computer program according to the twelfth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
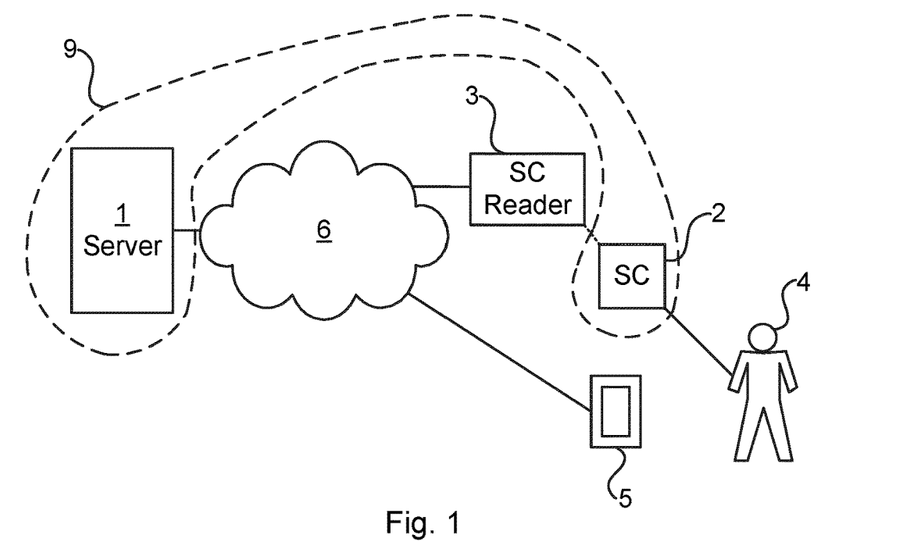
FIG. 1 is a schematic diagram illustrating an environment in which embodiments presented herein can be applied.

FIG. 1 is a schematic diagram illustrating an environment in which embodiments presented herein can be applied.

A smartcard 2 is any suitable smartcard, readable by a smartcard reader 3. The smartcard 2 can e.g. be based on RFID (Radio Frequency Identification) or any other suitable technology, e.g. galvanic connection, for communicating with the smartcard reader 3. The smartcard 2 is associated with a particular user 4.

The smartcard reader 3 is configured to communicate with the smartcard 2. The smartcard reader 3 can include a user interface, which can be used to present or describe a data item to be signed by the user 4, at least partly using the smartcard 2. Furthermore, the smartcard reader 3 is connected to a communication network 6, such as the Internet, to enable communication with a server 1. The smartcard reader 3 can act as a gateway to allow the smartcard 2 and the server 1 to communicate. In this way, the smartcard 2 and the server 1 can perform collective signing, which requires the use of both a smartcard secret key (stored in the smartcard) and a server secret key (stored in the server) to provide a collective signature which is valid. The collective signature is verified using a single public key, in the same way that a traditional cryptographic signature is verified. Thus, the signed data item can possibly be used together with existing standards for signing documents. The verifier (the smartcard reader party) can show the signed document to anyone to prove that the agreement was signed by the user (identified by the public key). Both the signature creation and the initial creation of the collective signing secrets for the smartcard and the server is done collectively.

More details on how collective signing can be implemented can e.g. be found in the article: Håkan Olsson, "DualSalt, distributed signing and decryption for NaCl", 2019 Feb. 18, available at https://github.com/assaabloy-ppi/dualsalt/blob/master/doc/dualsalt.pdf at the time of filing this patent application.

The server 1 and the smartcard 2 can be associated with the same service. In other words, the service provider responsible for the server 1 is the same party that is responsible for issuing the smartcard 2. In other words, the smartcard 2 is associated with a particular server 1. The server 1 and one or more instances of the smartcard 2 (for different users) is considered one system 9 for performing cryptographic signing of a data item using collective signing.

The server 1 can be one physical computer server or can be virtualised and/or load balanced over several physical computer servers in one or several physical sites. Nevertheless, the server 1 provides a service as described hereinbelow and is under supervision of the service provider.

The user 4 can also have access to a user device 5. The user device 5 is a portable device, e.g. a wearable device, a mobile phone (e.g. smartphone), tablet computer or laptop computer. The user 4 can connect to the server 1 using the user device 5, e.g. by logging in to an app (application) or web site associated with the server 1. This allows the user 4 to configure, on the server 1, how collective signing is to occur by the server 1 and the smartcard 2, e.g. when the user device 5 is to be used to be queried by the server 1 for confirmation, etc., as explained in more detail below.

Figure 2:
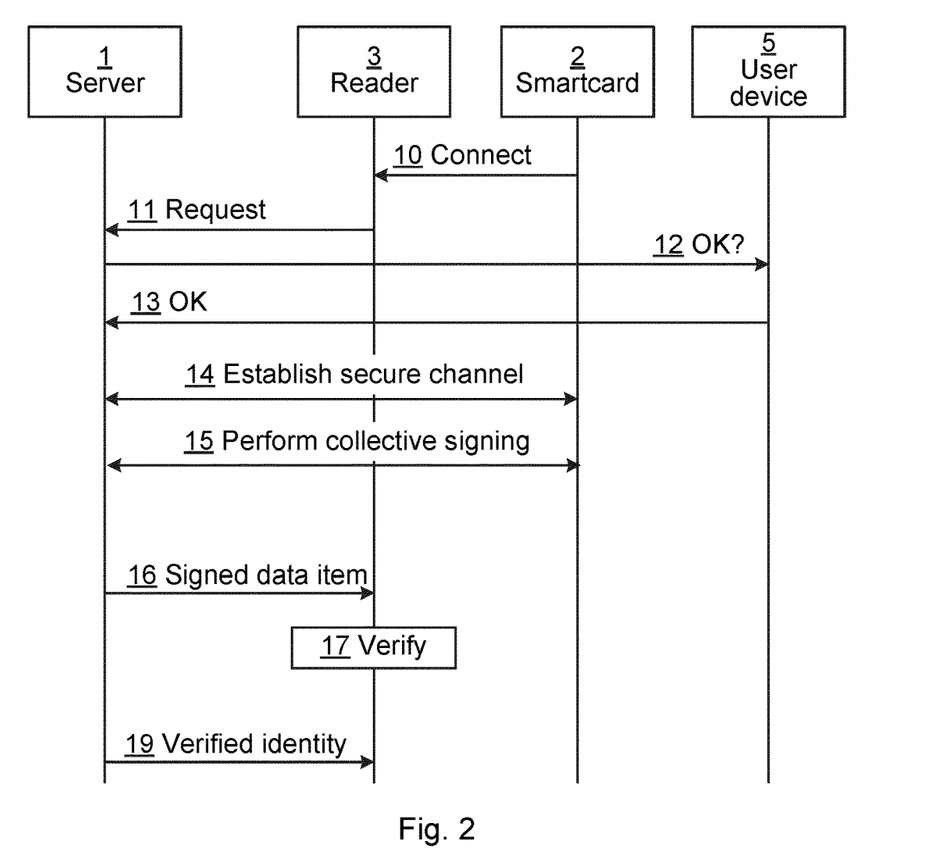
FIG. 2 is a sequence diagram illustrating communication between devices illustrated in FIG. 1 to perform a cryptographic signing operation.

FIG. 2 is a sequence diagram illustrating communication between devices illustrated in FIG. 1 to perform a cryptographic signing operation. Before this sequence starts, the smartcard reader 3 has determined a data item that needs to be signed. The data item can e.g. be related to allowing access to a particular asset, where the asset can be a physical asset (i.e. restricted physical space) or a logical asset, such as access to a computer or particular service of a computer. Alternatively or additionally, the data item can be related to a financial transaction, such as a purchase of goods and/or a service. Alternatively or additionally, the data item can be an agreement to use a particular service, for which the user needs to be identified.

First, the smartcard 2 connects 10 to the smartcard reader 3, e.g. by tapping the smartcard reader 3 with the smartcard 2 or inserting the smartcard 2 in the smartcard reader 3. This indicates that the user of the smartcard 2 is interested in accepting the conditions of the data item, e.g. for authentication, payment, identification, etc. In the connect 10 operation, the smartcard 2 provides parameters (e.g. URI (uniform resource indicator) or other address to the server and optionally login credentials) to the smartcard reader 3 to allow the smartcard reader 3 to connect to the particular server 1 associated with the smartcard 2.

The smartcard reader 3 sends a request 11 to the server 1 (addressed using the parameters obtained from the smartcard 2), to get the data item (collectively) signed.

Optionally, the server 1 then queries the user by sending (over a secure end-to-end communication channel) a query 12 to the user device 5 whether this is ok. The query contains details of what the data item concerns. The query 12 can be sent as a push message, such as an app push message, SMS (short message service), etc. The user device 5 presents the query to the user, whereby the user can choose to approve the signing or deny the signing. In this way, the smartcard is used for signing, and the user device is used to complement the smartcard with a user interface, since the smartcard lacks a user interface in itself.

If the user denies the signing, the sequence ends (not shown here), otherwise, the user device 5 sends an approval message 13 to the server 1. The approval message indicates that the user approves to sign the data item. By using the user device 5 for the query, the query does not need to be implemented using the reader device. This allows the reader device to not be trusted, which makes the whole signing operation to be implemented in a significantly more convenient and secure manner.

The server 1 then establishes a secure channel 14 with the smartcard 2. The secure channel is encrypted end-to-end between the server 1 and the smartcard 2, whereby the smartcard reader 3 only acts as a router for the communication of packets between the server 1 and the smartcard 2. The smartcard reader 3 is unable to read any of the communication between the server 1 and the smartcard 2. The secure channel can be achieved in many ways known in the art per se, with different number of round-trips (2-4 roundtrips typically). For example, TLS (Transport Layer Security) could be used.

Once the secure channel is established, the server 1 and the smartcard collaborate to perform collective signing 15. This involves the server 1 using the server secret key and the smartcard 2 using the smartcard secret key. It is to be noted that these keys do not need to be complete secret keys, in which case the server secret key and the smartcard secret key can only be used together, applied for collective signing.

The server 1 sends the signed data item 16 to the smartcard reader 3. At this point, the smartcard reader 3 can verify 17 the collective signature against a public key associated with the smartcard. By using collective signing, it is verified that both the smartcard secret key and the server secret key have been applied for the collective signature to be valid.

Optionally, the server 1 also provides a verified identity 19 to the smartcard reader. Since the service operator (of the server 1) issues the smartcard 2 to the user and provides a user account for the user, the service provider can require identity verification by the user to set up the account and issue the smartcard. Identity verification can e.g. be implemented by a trusted third party, or in any other suitable manner.

When the smartcard reader 3 has the verified identity, the party of the smartcard reader 3 can use this e.g. when renting out valuable equipment or properties.

Figure 3:
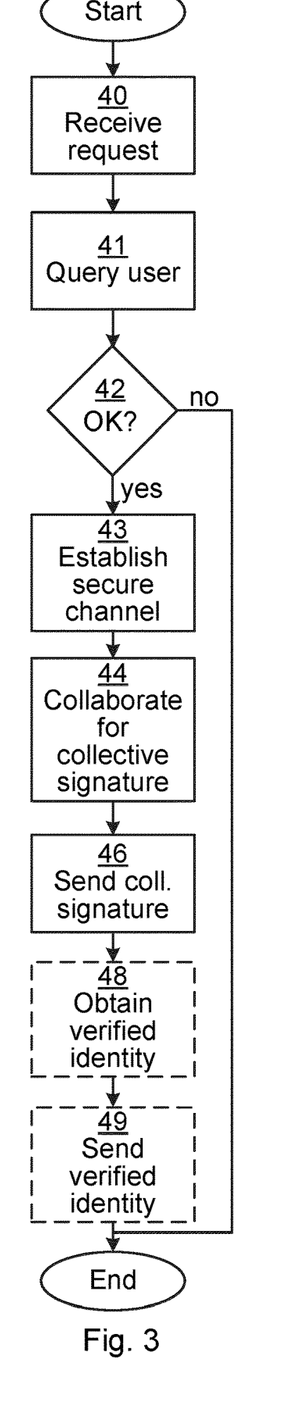
FIG. 3 is a flow chart illustrating embodiments of methods for performing a cryptographic signing operation of a data item, performed in the server of FIG. 1.

FIG. 3 is a flow chart illustrating embodiments of methods for performing a cryptographic signing operation of a data item, performed in the server 1 of FIG. 1. These embodiments method roughly corresponds to the actions of the server 1 in the sequence diagram of FIG. 2, as described above.

In a receive request step 40, the server receives, from a smartcard reader, a request for a data item to be collectively signed. The request comprises an indication of the data item and an identifier of the smartcard. As mentioned above, the indication can be a reference to the data item or a copy of the data item. The collective signing requires the use of both a smartcard secret key and a server secret key for the collective signature to be valid.

The identifier of the smartcard can be a public key of the smartcard, wherein the server secret key and the smartcard secret key collectively correspond to the public key of the smartcard. The smartcard reader can get the public key of the smartcard from the smartcard itself, of by querying the server using another identity obtained from the smartcard.

In a query user step 41, the server queries a user associated with the smartcard to sign the data item. Since the smartcard reader may not necessarily be a trusted entity, the server can communicate with the user device to implement the query to the user. In other words, the query to the user can be implemented without using the smartcard reader, in a communication channel which does not pass via the smartcard reader. In one embodiment, the querying is only performed when a query condition is true. The query condition is associated with the smartcard.

The query can e.g. be implemented by sending a push message to a user device of the user, when the user is logged in to a service of the server presented in the user device 8 (e.g. in an app or web browser). The user device transmits the response of the query to the server.

In a conditional ok step 42, the server determines whether the query result was affirmative, i.e. that a response was received that indicated that the user approves to sign the data item, in which case the method proceeds to an establish secure channel step 43. Otherwise, the method ends.

In the establish secure channel step 43, the server establishes a secure channel with the smartcard.

In a collaborate for collective signature step 44, the server collaborates with the smartcard over the secure channel to provide a collective signature of the data item, wherein the server bases computation of the collective signature on the data item, a server secret key and data received from the smartcard. The server secret key is specifically associated with the smartcard secret key. This step results in a collective signature.

In a send coll. signature step 46, the server sends the collective signature to the smartcard reader.

In an optional obtain verified identity step 48, the server obtains a verified identity associated with the smartcard.

In an optional send verified identity step 49, the server sends the verified identity to the smartcard reader.

Figure 4:
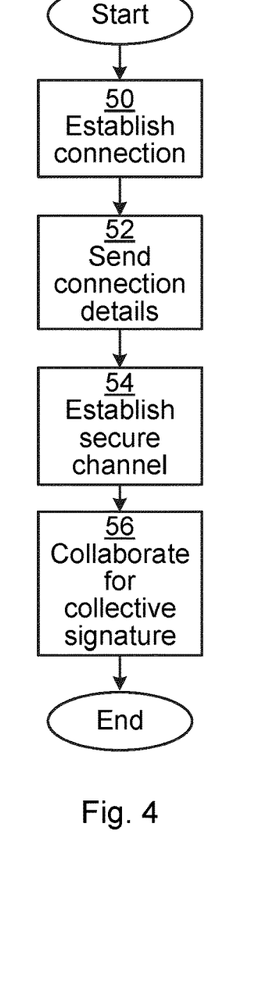
FIG. 4 is a flow chart illustrating embodiments of methods for performing a cryptographic signing operation of a data item, performed in the smartcard of FIG. 1.

FIG. 4 is a flow chart illustrating embodiments of methods for performing a cryptographic signing operation of a data item, performed in the smartcard 2 of FIG. 1. These embodiments method roughly corresponds to the actions of the smartcard 2 in the sequence diagram of FIG. 2, as described above.

In an establish connection step 50, the smartcard establishes a connection with the smartcard reader. As mentioned above, the connection can be wireless, e.g. using RFID, or galvanic.

In a send connection details step 52, the smartcard sends (to the smartcard reader) connection details to a server associated with the smartcard.

In an establish secure channel step 54, the smartcard establishing a secure channel with the server In a collaborate for collective signature step 56, the smartcard collaborates with the server over the secure channel to provide a collective signature of the data item, wherein the smartcard bases the signature on the data item and a smartcard secret key, wherein the collective signing requires the use of both the smartcard key and a server secret key for the collective signature to be valid.

Figure 5:
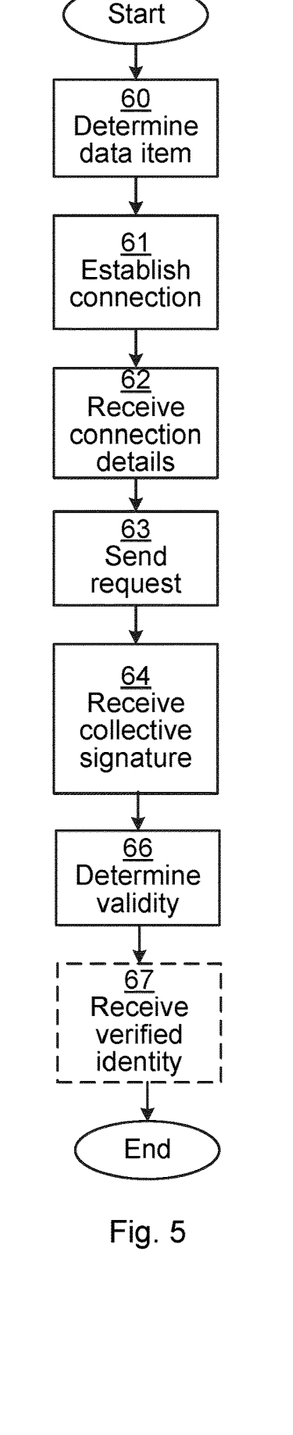
FIG. 5 is a flow chart illustrating embodiments of methods for enabling cryptographic signing operation of a data item, performed in the smartcard reader of FIG. 1.

FIG. 5 is a flow chart illustrating embodiments of methods for enabling cryptographic signing operation of a data item, performed in the smartcard reader 3 of FIG. 1. These embodiments method roughly corresponds to the actions of the smartcard reader 3 in the sequence diagram of FIG. 2, as described above.

In a determine data item step 60, the smartcard reader determines a data item to be cryptographically signed.

In an establish connection step 61, the smartcard reader establishes a connection with a smartcard.

In a receive connection details step 62, the smartcard reader receives (from the smartcard) connection details to a server associated with the smartcard.

In a send request step 63, the smartcard reader sends (to the server) a request for the data item to be collectively signed. The request comprises an indication of the data item and an identifier of the smartcard. As explained above, the collective signing requires the use of both a smartcard secret key and a server secret key for the collective signature to be valid.

In a receive collective signature step 64, the smartcard reader receives the collective signature from the server.

In a determine validity step 66, the smartcard reader determines whether the data item is collectively signed based on the collective signature and a public key associated with the collective signature. The smartcard reader can get the public key of the smartcard from the smartcard itself, of by querying the server using another identity obtained from the smartcard.

In an optional receive verified identity step 67, the smartcard reader receives a verified identity from the server. The verified identity is associated with the smartcard.

Using embodiments presented herein, the signing is effected without exposing secrets for the smartcard reader. In this way, the smartcard reader does not need to be trusted and is used to allow (secure) communication between the server and the smartcard. Also the user query is implemented without exposing any details to the smartcard reader.

Figure 6:
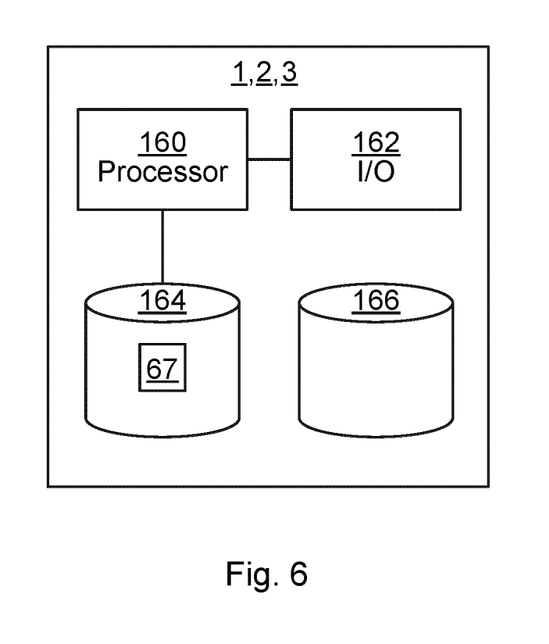
FIG. 6 is a schematic diagram illustrating components of each one of the server, the smartcard and the smartcard reader.

FIG. 6 is a schematic diagram illustrating components of each one of the server 1, the smartcard 2 and the smartcard reader 3. While the specifications and type of these components can vary between the different devices, the general concepts presented herein are applicable to all of these components. A processor 16o is provided using any combination of one or more of a suitable central processing unit (CPU), multiprocessor, microcontroller, digital signal processor (DSP), etc., capable of executing software instructions 167 stored in a memory 164, which can thus be a computer program product. The processor 60 could alternatively be implemented using an application specific integrated circuit (ASIC), field programmable gate array (FPGA), etc. The processor 16o can be configured to execute the method described with reference to FIGS. 3-5 above.

The memory 164 can be any combination of random-access memory (RAM) and/or read-only memory (ROM). The memory 164 also comprises persistent storage, which, for example, can be any single one or combination of magnetic memory, optical memory, solid-state memory or even remotely mounted memory.

A data memory 166 is also provided for reading and/or storing data during execution of software instructions in the processor 16o. The data memory 166 can be any combination of RAM and/or ROM.

An I/O interface 162 is provided for communicating with external and/or internal entities.

Other components are omitted in order not to obscure the concepts presented herein.

Figure 7:
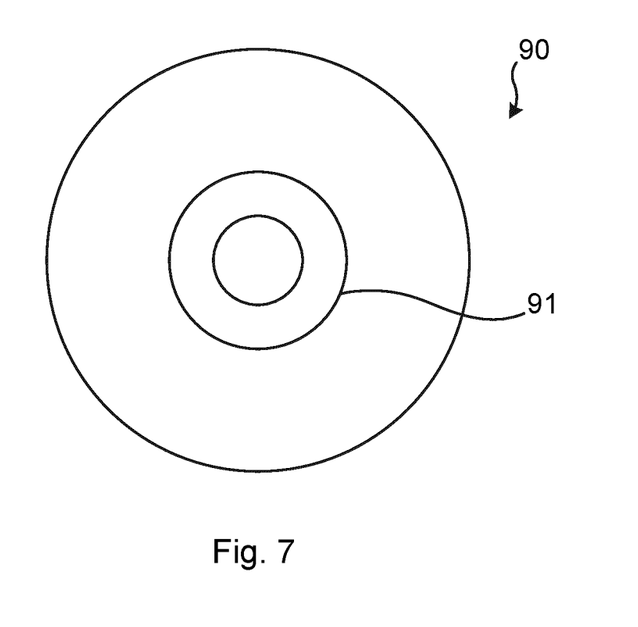
FIG. 7 shows one example of a computer program product comprising computer readable means.

FIG. 7 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 164 of FIG. 6. While the computer program 91 is here schematically shown as a track on the depicted optical disk, the computer program can be stored in any way which is suitable for the computer program product, such as a removable solid-state memory, e.g. a Universal Serial Bus (USB) drive.

Using embodiments presented herein, a convenient, yet secure, way of providing cryptographic signing is provided using smartcards. Smartcards are more secure than mobile phones, since it is very difficult for an attacker to access securely stored data on the smartcards.

By using collective signing, an additional layer of security and flexibility is provided. If a smartcard is lost, the user can invalidate the lost key using the user's user device to access the server of the service provider. Moreover, the smartcard reader does not need to be trusted in the embodiments presented herein. The reader is not provided with any sensitive information, such as pin codes, secret keys, etc.

Here now follows a list of embodiments from another perspective, enumerated with roman numerals.

i. A method for performing a cryptographic signing operation of a data item, the method being performed in a server and comprising the steps of:
  receiving, from a smartcard reader, a request for a data item to be collectively signed, the request comprising an indication of the data item and an identifier of a smartcard, wherein the collective signing requires the use of both a smartcard secret key and a server secret key for the collective signature to be valid;
  establishing a secure channel with the smartcard;
  collaborating with the smartcard over the secure channel to provide a collective signature of the data item, wherein the server bases computation of the collective signature on the data item, a server secret key and data received from the smartcard, wherein the server secret key is specifically associated with the smartcard secret key, resulting in a collective signature; and
  sending the collective signature to the smartcard reader.

ii. The method according to embodiment i, wherein the identifier of the smartcard is a public key of the smartcard, wherein the server secret key and the smartcard secret key collectively correspond to the public key of the smartcard.

iii. The method according to any one of the preceding embodiments, further comprising the step of:
  querying a user associated with the smartcard to sign the data item;
  and wherein the steps of triggering, determining and sending are only performed when the user approves to sign the data item.

iv. The method according to embodiment iii, wherein the querying is only performed when a query condition is true, the query condition being associated with the smartcard.

v. The method according to any one of the preceding embodiments, further comprising the steps of:
  obtaining a verified identity associated with the smartcard; and
  sending the verified identity to the smartcard reader.

vi. A server for performing a cryptographic signing operation of a data item, the server comprising:
  a processor; and
  a memory storing instructions that, when executed by the processor, cause the server to:
  receive, from a smartcard reader, a request for a data item to be collectively signed, the request comprising an indication of the data item and an identifier of a smartcard, wherein the collective signing requires the use of both a smartcard secret key and a server secret key for the collective signature to be valid;
  establish a secure channel with the smartcard secret;
  collaborate with the smartcard over the secure channel to provide a collective signature of the data item, wherein the server bases computation of the collective signature on the data item, a server secret key and data received from the smartcard, wherein the server secret key is specifically associated with the smartcard secret key, resulting in a collective signature; and
  send the collective signature to the smartcard reader.

vii. The server according to embodiment vi, wherein the identifier of the smartcard is a public key of the smartcard, wherein the server secret key and the smartcard secret key collectively correspond to the public key of the smartcard.

viii. The server according to embodiment vi or vii, further comprising instructions that, when executed by the processor, cause the server to:
  query a user associated with the smartcard to sign the data item; and only perform the instructions to trigger, determine and send when the user approves to sign the data item.

ix. The server according to embodiment viii, further comprising instructions that, when executed by the processor, cause the server to: only execute the instructions to query when a query condition is true, the query condition being associated with the smartcard.

x. The server according to any one of embodiments vi to ix, further comprising instructions that, when executed by the processor, cause the server to: obtain a verified identity associated with the smartcard; and send the verified identity to the smartcard reader.

xi. A computer program for performing a cryptographic signing operation of a data item, the computer program comprising computer program code which, when run on a server causes the server to:
receive, from a smartcard reader, a request for a data item to be collectively signed, the request comprising an indication of the data item and an identifier of a smartcard, wherein the collective signing requires the use of both a smartcard secret key and a server secret key for the collective signature to be valid;
establish a secure channel with the smartcard;
collaborate with the smartcard over the secure channel to obtain a collective signature of the data item, wherein the server bases computation of the collective signature on the data item, a server secret key and data received from the smartcard, wherein the server secret key is specifically associated with the smartcard secret key, resulting in a collective signature; and
send the collective signature to the smartcard reader.

xii. A computer program product comprising a computer program according to embodiment xi and a computer readable means on which the computer program is stored.

xiii. A method for performing a cryptographic signing operation of a data item, the method being performed in a smartcard and comprising the steps of:
establishing a connection with a smartcard reader;
sending, to the smartcard reader connection details to a server associated with the smartcard;
establishing a secure channel with the server; and
collaborating with the server over the secure channel to provide a collective signature of the data item, wherein the smartcard bases the signature on the data item and a smartcard secret key, wherein the collective signing requires the use of both the smartcard key and a server secret key for the collective signature to be valid.

xiv. A smartcard for performing a cryptographic signing operation of a data item, the smartcard comprising:
a processor; and
a memory storing instructions that, when executed by the processor, cause the smartcard to:
establish a connection with a smartcard reader;
send, to the smartcard reader connection details to a server associated with the smartcard;
establish a secure channel with the server; and
collaborate with the server over the secure channel to provide a collective signature of the data item, wherein the smartcard bases the signature on the data item and a smartcard secret key, wherein the collective signing requires the use of both the smartcard key and a server secret key for the collective signature to be valid.

xv. A computer program for performing a cryptographic signing operation of a data item, the computer program comprising computer program code which, when run on a smartcard causes the smartcard to:
establish a connection with a smartcard reader;
send, to the smartcard reader connection details to a server associated with the smartcard;
establish a secure channel with the server; and
collaborate with the server over the secure channel to provide a collective signature of the data item, wherein the smartcard bases the signature on the data item and a smartcard secret key, wherein the collective signing requires the use of both the smartcard key and a server secret key for the collective signature to be valid.

xvi. A computer program product comprising a computer program according to embodiment xv and a computer readable means on which the computer program is stored.

xvii. A system comprising the server according to any one of embodiments vi to x and the smartcard according to embodiment xiv.

xviii. A method for enabling a cryptographic signing operation of a data item, the method being performed in a smartcard reader and comprising the steps of:
determining a data item to be cryptographically signed;
establishing a connection with a smartcard;
receiving, from the smartcard, connection details to a server associated with the smartcard;
sending, to the server, a request for the data item to be collectively signed, the request comprising an indication of the data item and an identifier of the smartcard, wherein the collective signing requires the use of both a smartcard secret key and a server secret key for the collective signature to be valid;
receiving the collective signature from the server; and
determining whether the data item is collectively signed based on the collective signature and a public key associated with the collective signature.

xix The method according to embodiment xviii, further comprising the step of:
receiving a verified identity from the server, the verified identity being associated with the smartcard.

xx. A smartcard reader for enabling a cryptographic signing operation of a data item, the smartcard reader comprising:
a processor; and
a memory storing instructions that, when executed by the processor, cause the smartcard reader to:
determine a data item to be cryptographically signed;
establish a connection with a smartcard;
receive, from the smartcard connection details to a server associated with the smartcard;
send, to the server, a request for the data item to be collectively signed, the request comprising an indication of the data item and an identifier of the smartcard, wherein the collective signing requires the use of both a smartcard secret key and a server secret key for the collective signature to be valid;
receive the collective signature from the server; and
determine whether the data item is collectively signed based on the collective signature and a public key associated with the collective signature.

xxi The smartcard reader according to embodiment xx, further comprising instructions that, when executed by the processor, cause the smartcard reader to:
receive a verified identity from the server, the verified identity being associated with the smartcard.

xxii. A computer program for enabling a cryptographic signing operation of a data item, the computer program comprising computer program code which, when run on a smartcard reader causes the smartcard reader to:
determine a data item to be cryptographically signed;
establish a connection with a smartcard;

receive, from the smartcard connection details to a server associated with the smartcard;

send, to the server, a request for the data item to be collectively signed, the request comprising an indication of the data item and an identifier of the smartcard, wherein the collective signing requires the use of both a smartcard secret key and a server secret key for the collective signature to be valid;

receive the collective signature from the server; and determine whether the data item is collectively signed based on the collective signature and a public key associated with the collective signature.

xxiii. A computer program product comprising a computer program according to embodiment xxii and a computer readable means on which the computer program is stored.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for performing a cryptographic signing operation of a data item, the method being performed in a server and comprising:
    receiving, from a smartcard reader, a request for a data item to be collectively signed, the request comprising an indication of the data item and an identifier of a smartcard;
    querying a user associated with the smartcard to sign the data item;
    receiving a response indicating that the user approves to sign the data item;
    establishing a secure channel with the smartcard, the secure channel being encrypted end-to-end between the server and the smartcard;
    collaborating with the smartcard over the secure channel to provide a collective signature of the data item, which comprises generating a cryptographic signature of the data item based on a server secret key, wherein the server secret key is specifically associated with a smartcard secret key, wherein the collective signature requires both that the server generates a cryptographic server signature of the data item based on the server secret key and that the smartcard generates a cryptographic smartcard signature of the data item based on the smartcard secret key, for the collective signature to be valid; and
    sending the collective signature to the smartcard reader.

2. The method according to claim 1, wherein the identifier of the smartcard is a public key of the smartcard, wherein the server secret key and the smartcard secret key collectively correspond to the public key of the smartcard.

3. The method according to claim 1, wherein the querying is only performed when a query condition is true, the query condition being associated with the smartcard.

4. The method according to claim 1, further comprising:
    obtaining a verified identity associated with the smartcard; and
    sending the verified identity to the smartcard reader.

5. A server for performing a cryptographic signing operation of a data item, the server comprising:
    a processor; and
    a memory storing instructions that, when executed by the processor, cause the server to:
        receive, from a smartcard reader, a request for a data item to be collectively signed, the request comprising an indication of the data item and an identifier of a smartcard;
        query a user associated with the smartcard to sign the data item;
        receive a response indicating that the user approves to sign the data item;
        establish a secure channel with the smartcard, the secure channel being encrypted end-to-end between the server and the smartcard;
        collaborate with the smartcard over the secure channel to provide a collective signature of the data item, which comprises generating a cryptographic signature of the data item based on a server secret key, wherein the server secret key is specifically associated with a smartcard secret key, wherein the collective signature requires both that the server generates a cryptographic server signature of the data item based on the server secret key and that the smartcard generates a cryptographic smartcard signature of the data item based on the smartcard secret key, for the collective signature to be valid; and
        send the collective signature to the smartcard reader.

6. The server according to claim 5, wherein the identifier of the smartcard is a public key of the smartcard, wherein the server secret key and the smartcard secret key collectively correspond to the public key of the smartcard.

7. The server according to claim 5, further comprising instructions that, when executed by the processor, cause the server to: only execute the instructions to query when a query condition is true, the query condition being associated with the smartcard.

8. The server according to claim 5, further comprising instructions that, when executed by the processor, cause the server to:
    obtain a verified identity associated with the smartcard; and
    send the verified identity to the smartcard reader.

9. A non-transitory computer readable medium comprising a computer program for performing a cryptographic signing operation of a data item, the computer program comprising computer program code which, when run on a server, causes the server to:
    receive, from a smartcard reader, a request for a data item to be collectively signed, the request comprising an indication of the data item and an identifier of a smartcard;
    query a user associated with the smartcard to sign the data item;
    receive a response indicating that the user approves to sign the data item;
    establish a secure channel with the smartcard, the secure channel being encrypted end-to-end between the server and the smartcard;
    collaborate with the smartcard over the secure channel to obtain a collective signature of the data item, which comprises generating a cryptographic signature of the data item based on a server secret key, wherein the server secret key is specifically associated with a smartcard secret key, wherein the collective signature requires both that the server generates a cryptographic server signature of the data item based on the server secret key and that the smartcard generates a cryptographic smartcard signature of the data item based on the smartcard secret key, for the collective signature to be valid; and
send the collective signature to the smartcard reader.

10. A method for performing a cryptographic signing operation of a data item, the method being performed in a smartcard and comprising:
establishing a connection with a smartcard reader;
sending, to the smartcard reader, connection details to a server associated with the smartcard to enable the smartcard reader to send, to the server, a request for the data item to be collectively signed;
establishing a secure channel with the server, the secure channel being encrypted end-to-end between the server and the smartcard; and
collaborating with the server over the secure channel to provide a collective signature of the data item, which comprises generating a cryptographic signature of the data item and based on a smartcard secret key, wherein the collective signature requires both that the smartcard generates a cryptographic smartcard signature of the data item based on the smartcard secret key and that the server generates a cryptographic server signature of the data item based on a server secret key, for the collective signature to be valid.

11. A smartcard for performing a cryptographic signing operation of a data item, the smartcard comprising:
a processor; and
a memory storing instructions that, when executed by the processor, cause the smartcard to:
establish a connection with a smartcard reader;
send, to the smartcard reader, connection details to a server associated with the smartcard to enable the smartcard reader to send, to the server, a request for the data item to be collectively signed;
establish a secure channel with the server, the secure channel being encrypted end-to-end between the server and the smartcard; and
collaborate with the server over the secure channel to provide a collective signature of the data item, which comprises generating a cryptographic signature of the data item based on a smartcard secret key, wherein the collective signature requires both that the smartcard generates a cryptographic smartcard signature of the data item based on the smartcard secret key and that the server generates a cryptographic server signature of the data item based on a server secret key, for the collective signature to be valid.

12. A non-transitory computer readable medium comprising a computer program for performing a cryptographic signing operation of a data item, the computer program comprising computer program code which, when run on a smartcard, causes the smartcard to:
establish a connection with a smartcard reader;
send, to the smartcard reader, connection details to a server associated with the smartcard to enable the smartcard reader to send, to the server, a request for the data item to be collectively signed;
establish a secure channel with the server, the secure channel being encrypted end-to-end between the server and the smartcard; and
collaborate with the server over the secure channel to provide a collective signature of the data item, which comprises generating a cryptographic signature of the data item and based on a smartcard secret key, wherein the collective signature requires both that the smartcard generates a cryptographic smartcard signature of the data item based on the smartcard secret key and that the server generates a cryptographic server signature of the data item based on a server secret key, for the collective signature to be valid.

13. A method for enabling a cryptographic signing operation of a data item, the method being performed in a smartcard reader and comprising:
determining a data item to be cryptographically signed;
establishing a connection with a smartcard;
receiving, from the smartcard, connection details to a server associated with the smartcard;
sending, to the server, a request for the data item to be collectively signed, the request comprising an indication of the data item and an identifier of the smartcard, wherein the collective signing requires both that the smartcard generates a cryptographic smartcard signature of the data item based on a smartcard secret key and that the server generates a cryptographic server signature of the data item based on a server secret key, for a collective signature resulting from the collective signing to be valid;
acting as a router for communication of packets between the server and the smartcard to enable an end-to-end secure channel between the server and the smartcard;
receiving the collective signature from the server; and
determining whether the data item is collectively signed based on the collective signature and a public key associated with the collective signature.

14. The method according to claim 13, further comprising:
receiving a verified identity from the server, the verified identity being associated with the smartcard.

15. A smartcard reader for enabling a cryptographic signing operation of a data item, the smartcard reader comprising:
a processor; and
a memory storing instructions that, when executed by the processor, cause the smartcard reader to:
determine a data item to be cryptographically signed;
establish a connection with a smartcard;
receive, from the smartcard, connection details to a server associated with the smartcard;
send, to the server, a request for the data item to be collectively signed, the request comprising an indication of the data item and an identifier of the smartcard, wherein collective signing requires both that the smartcard generates a cryptographic smartcard signature of the data item based on a smartcard secret key and that the server generates a cryptographic server signature of the data item based on a server secret key, for a collective signature resulting from the collective signing to be valid;
act as a router for communication of packets between the server and the smartcard to enable an end-to-end secure channel between the server and the smartcard;
receive the collective signature from the server; and
determine whether the data item is collectively signed based on the collective signature and a public key associated with the collective signature.

16. The smartcard reader according to claim 15, further comprising instructions that, when executed by the processor, cause the smartcard reader to:
receive a verified identity from the server, the verified identity being associated with the smartcard.

17. A non-transitory computer readable medium comprising a computer program for enabling a cryptographic signing operation of a data item, the computer program comprising computer program code which, when run on a smartcard reader, causes the smartcard reader to:
- determine a data item to be cryptographically signed;
- establish a connection with a smartcard;
- receive, from the smartcard, connection details to a server associated with the smartcard;
- send, to the server, a request for the data item to be collectively signed, the request comprising an indication of the data item and an identifier of the smartcard, wherein collective signing requires both that the smartcard generates a cryptographic smartcard signature of the data item based on a smartcard secret key and that the server generates a cryptographic server signature of the data item based on a server secret key, for a collective signature resulting from the collective signing to be valid;
- act as a router for communication of packets between the server and the smartcard to enable an end-to-end secure channel between the server and the smartcard;
- receive the collective signature from the server; and
- determine whether the data item is collectively signed based on the collective signature and a public key associated with the collective signature.

* * * * *